C. O. SCHELLENBACH.
EXPANSIBLE REAMER.
APPLICATION FILED JUNE 21, 1917.

1,241,668.

Patented Oct. 2, 1917.

Inventor
Charles O. Schellenbach

By Wood & Wood
Attorneys

UNITED STATES PATENT OFFICE.

CHARLES O. SCHELLENBACH, OF CINCINNATI, OHIO.

EXPANSIBLE REAMER.

1,241,668.     Specification of Letters Patent.     Patented Oct. 2, 1917.

Application filed June 21, 1917. Serial No. 175,995.

*To all whom it may concern:*

Be it known that I, CHARLES O. SCHELLENBACH, a citizen of the United States, and residing at Cincinnati, in the county of Hamilton and State of Ohio, have invented a new and useful Improvement in Expansible Reamers, of which the following specification is a full disclosure.

My invention relates to an improved expanding reamer, the object being to provide a cheap, strong and efficient reamer easily operated to produce any exact degree of expansibility and which can be most conveniently and economically manufactured.

The features of the invention will be more fully set forth in the description of the accompanying drawing, wherein.

Figure 1:
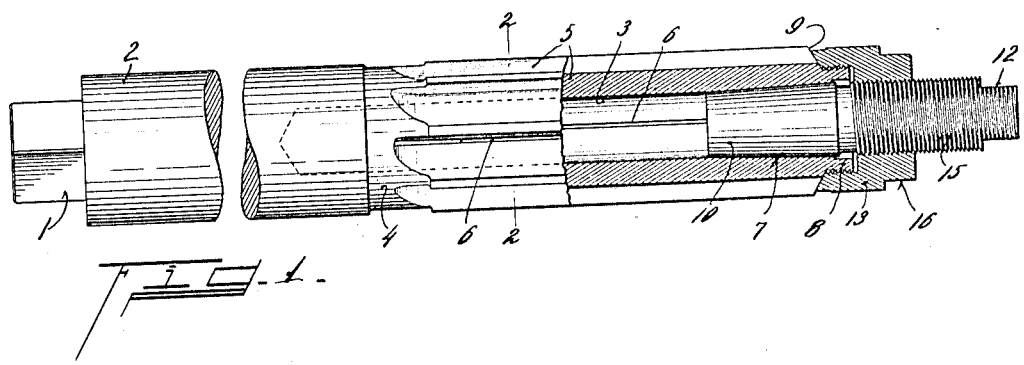
Figure 1 is a side elevation, partly in section.
Figures 2, 3:
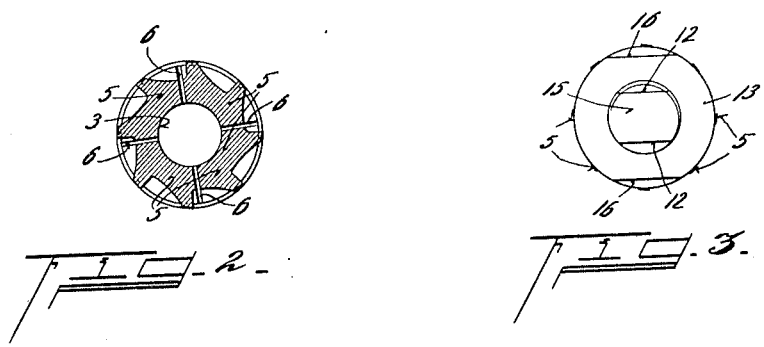
Fig. 2 is a section on line 2—2, Fig. 1.
Fig. 3 is an elevation of the forward end.

The reamer is formed with the conventional socket end 1 having a cylindrical portion 2 into which the central bore preferably extends as shown in dotted lines, Fig. 1.

Projecting forwardly from the cylindrical portion is the cutting portion 4, of the reamer formed with the integral, radial blades 5, and having a series of longitudinal splits 6, between the blades, the blade portion being formed with the central taper bore 7. It will be noted that the interior surface of the bore is plain and there are no internal screw threads for effecting the expansibility.

The forward end of the reamer is of reduced diameter constituting the screw threaded stub end 8, the terminal portion of the blade part of the reamer forming a tapered shoulder or seat 9 for the locking element. Of course the splits, permitting the expansibility, separate the blade end into a series of segments. These segments are expanded by means of a relatively short expander having a taper end 10 for engaging interiorly the taper portion 7 of the reamer bore, the outer or cylindrical screw threaded shank end 15 of the plug having flattened sides 12 providing a wrench receiving end for manipulating the expander.

To operate and set the expander, I provide a sleeve clamp nut 13 which sets cap-like on the stub end of the reamer, the outer circumference being smooth and the diameter being relatively less than that of the blades. This clamp nut is formed with an enlarged inner bored portion having internal screw threads for engaging the screw threads on the stub end 8 of the reamer, and it is formed with the reduced diameter internally screw threaded portion having a screw thread engagement with the screw threaded shank end 15 of the expanding plug.

In operation, the clamp nut 13 is screwed upon the shank end 15 of the expanding plug 10 and the expanding plug is inserted into the reamer bore, the clamp nut 13 being screwed on the plug threads until the larger diameter bore screw threads engage upon the screw threads of the reamer stub end 8. The clamp nut is then held stationary as by gripping the flattened surfaces 16, and the screw plug is screwed inwardly through the sleeve, advancing the taper portion 10 to expand the reamer blades 5 to any required degree, after which the expanding plug remains stationary and the nut 13 is turned inwardly on the plug threads and the threads of the stub end 8 until the inner end taper surface of the nut abuts or seats against the tapered shoulder portion 9 of the reamer, functioning as a clamp to hold the expanding plug in adjusted position.

It is very desirable to be able to form and operate a reamer without any interior screw threads in the reamer proper and to be able to effect the required expansion with a relatively short tapered plug.

Also it is very simple and advantageous to constitute a sleeve nut as both the means for advancing the taper plug for expanding and then for setting or clamping the adjustment.

Having described my invention, I claim:

1. An expansible reamer comprising a centrally taper-bored, longitudinally-split blade portion, having a reduced diameter externally screw threaded end, a taper plug having an externally screw threaded end, and a member having internal screw threads to respectively engage the reamer and the plug threads.

2. An expansible reamer comprising a centrally taper-bored, longitudinally-split blade portion having a reduced diameter externally screw-threaded end, a taper plug having a screw-threaded end, and a recessed counter-bored member for abuttingly engaging the ends of the blade and internally screw-threaded to respectively engage the reamer and plug threads.

3. An expansible reamer comprising a longitudinally-split blade portion, centrally taper-bored, a clamp element screw threaded on the outer end thereof and an expander plug screw threaded in the clamp element and projecting within the taper-bore.

4. An expansible reamer comprising a longitudinally-split blade portion, centrally taper-bored and terminating with a screw threaded stud end defining a tapered seat, a clamp element peripherally flanged to engage over said tapered seat and internally screw threaded for a coöperative screw thread engagement with the screw threaded stud end, and an expander plug screw threaded in the clamp element and projecting within the taper-bore.

5. An expansible reamer comprising a longitudinally-split blade portion, centrally taper-bored, a clamp element screw threaded on the outer end thereof and an expander plug screw threaded in the clamp element and provided with a tapered end projecting within the taper bore.

6. An expansible reamer comprising a longitudinally-split, centrally bored blade portion, a clamp element screw threaded thereon and an expander plug screw threaded in the clamp element and provided with a tapered end projecting within the bore of the blade portion to engage and expand the blades.

In witness whereof, I hereunto subscribe my name, as attested by the two subscribing witnesses.

CHARLES O. SCHELLENBACH.

Witnesses:
 CLARENCE B. FOSTER,
 L. A. BUCK.

Copies of this patent may be obtained for five cents each, by addressing the "Commissioner of Patents, Washington, D. C."